(12) United States Patent
Pleis

(10) Patent No.: US 10,147,067 B2
(45) Date of Patent: Dec. 4, 2018

(54) DRONE OPERATED DELIVERY RECEPTACLE

(71) Applicant: James Pleis, Waretown, NJ (US)

(72) Inventor: James Pleis, Waretown, NJ (US)

( * ) Notice: Subject to any disclaimer, the term of this patent is extended or adjusted under 35 U.S.C. 154(b) by 0 days.

(21) Appl. No.: 15/289,295

(22) Filed: Oct. 10, 2016

(65) Prior Publication Data
US 2017/0116568 A1    Apr. 27, 2017

Related U.S. Application Data

(60) Provisional application No. 62/244,248, filed on Oct. 21, 2015.

(51) Int. Cl.
| | |
|---|---|
| *G06Q 10/08* | (2012.01) |
| *A47G 29/12* | (2006.01) |
| *A47G 29/122* | (2006.01) |
| *A47G 29/14* | (2006.01) |

(52) U.S. Cl.
CPC ..... *G06Q 10/0832* (2013.01); *A47G 29/1201* (2013.01); *A47G 29/1225* (2013.01); *A47G 29/14* (2013.01); *A47G 2029/1226* (2013.01)

(58) Field of Classification Search
CPC ............... G06Q 10/0832; A47G 29/12; A47G 29/1201; A47G 29/1214; A47G 29/124; A47G 29/126; A47G 29/141; A47G 29/1225; A47G 2029/1226; A47G 2029/148; A47G 2029/149; A47G 29/16; A47G 2/209; A47G 29/20; B64C 39/024; B64C 2201/128; G07C 9/00896; B64F 1/32

USPC ............ 232/17, 19, 44, 45, 43.1, 43.5; 220/345.1, 345.2; 340/568.1, 569, 5.73; 70/63, 158; 200/61.63; 244/114 R
See application file for complete search history.

(56) References Cited

U.S. PATENT DOCUMENTS

| | | | | |
|---|---|---|---|---|
| 4,429,491 A * | 2/1984 | Bruns | ..................... | E05F 15/53 49/340 |
| 5,954,264 A * | 9/1999 | Keller | ................ | A47G 29/1209 232/17 |
| 5,979,750 A * | 11/1999 | Kindell | ................ | A47G 29/141 232/1 R |
| 6,793,110 B2 * | 9/2004 | Hamilton | ................... | B62J 9/00 224/413 |
| 6,957,767 B2 * | 10/2005 | Aupperle | ........... | A47G 29/1216 232/34 |
| 7,175,071 B1 * | 2/2007 | Slagle | .................... | A47G 29/16 220/833 |

(Continued)

*Primary Examiner* — William L Miller
(74) *Attorney, Agent, or Firm* — Global Intellectual Property Agency, LLC; Daniel Boudwin

(57) ABSTRACT

A drone operated delivery receptacle for receiving packages. The delivery receptacle includes a housing having a base, sidewalls, and an open upper end, defining an interior volume. The open upper end includes one or more gates that are movable between an open and closed configuration, and are configured to open when a delivery drone is detected by a control unit of the delivery receptacle. Preferably, the one or more gates are configured to automatically open when a drone is detected so as to allow the drone to deposit the package therein. A front wall of the housing comprises one or more doors thereon that allow the user to access the interior volume of the housing to retrieve the package therein.

5 Claims, 3 Drawing Sheets

(56) References Cited

U.S. PATENT DOCUMENTS

| | | | |
|---|---|---|---|
| 7,249,705 B2* | 7/2007 | Dudley | A47G 29/22 232/45 |
| 7,256,691 B2* | 8/2007 | Awobue | A47G 29/1214 232/17 |
| 7,815,068 B2* | 10/2010 | Clark | B60J 7/085 220/345.1 |
| 8,087,336 B2 | 1/2012 | Fleischer et al. | |
| 9,211,025 B1* | 12/2015 | Elhawwashy | A47G 29/20 |
| 2013/0212954 A1 | 8/2013 | Taylor et al. | |
| 2013/0332008 A1 | 12/2013 | Herman et al. | |
| 2014/0025235 A1 | 1/2014 | Levien et al. | |
| 2014/0032034 A1 | 1/2014 | Raptopoulos et al. | |
| 2014/0046512 A1* | 2/2014 | Villamar | G05D 1/0212 701/19 |
| 2014/0254896 A1 | 9/2014 | Zhou et al. | |
| 2015/0006005 A1* | 1/2015 | Yu | G06Q 10/08 701/22 |
| 2016/0157653 A1* | 6/2016 | Manitta | A47G 29/1209 232/27 |
| 2017/0091710 A1* | 3/2017 | Van Dyke | G06Q 10/0835 |
| 2017/0116568 A1* | 4/2017 | Pleis | G06Q 10/0832 |
| 2017/0147975 A1* | 5/2017 | Natarajan | B64C 39/024 |
| 2017/0203857 A1* | 7/2017 | O'Toole | B64F 1/32 |
| 2017/0228692 A1* | 8/2017 | Pargoe | G06Q 10/0836 |

\* cited by examiner

DRONE OPERATED DELIVERY RECEPTACLE

CROSS REFERENCE TO RELATED APPLICATION

This application claims the benefit of U.S. Provisional Application No. 62/244,248 filed on Oct. 21, 2015. The above identified patent application is herein incorporated by reference in its entirety to provide continuity of disclosure.

BACKGROUND OF THE INVENTION

Field of the Invention

The present invention relates to delivery receptacles. More specifically, the present invention provides a drone operated delivery receptacle adapted to provide a drone delivering a package with a secure location for dropping off said package at a user's residence or place of business.

Unmanned vehicles, commonly referred to as "drones," are growing in popularity and can be used to deliver small objects or packages. Using unmanned vehicles allows the distributor or shipper of goods to efficiently deliver packages by minimizing travel time and travel expenses. It is not necessary to hire a delivery person to drive a van or other vehicle, or to hand deliver the package to a person's home or business. However, the lack of human interaction requires the drone to simply leave a package or object unattended in a specific location. For example, the drone may simply drop the package off on a person's porch or stoop, outside of the persons home.

As a result, once a drone drops off a package, the package is left unattended for a period of time and the package is unsecure. The package may be at risk for theft by another person who sees the package is unattended. Further, if the package is left outdoors, inclement weather may damage the package. Thus, a delivery receptacle for receiving a package delivered by a drone is desired in order to keep the package safe until the user is able to retrieve the package.

Devices have been disclosed in the known art that relate to delivery systems. These include devices that have been patented and published in patent application publications. These devices generally relate to delivery methods utilizing unmanned vehicles. Other devices relate to hatches having a particular construction.

These devices in the known art have several known drawbacks. The devices in the known art fail to provide a delivery receptacle for a residence or place of business that provides an unmanned delivery vehicle with a place to deposit a package. Such devices fail to provide a means for ensuring that the package reaches its intended recipient and is not stolen or damaged once delivered to the user's residence or place of business.

In light of the devices disclosed in the known art, it is submitted that the present invention substantially diverges in design elements from the prior art and consequently it is clear that there is a need in the art for an improvement to existing delivery devices. In this regard the instant invention substantially fulfills these needs.

SUMMARY OF THE INVENTION

In view of the foregoing disadvantages inherent in the known types of delivery receptacles now present in the known art, the present invention provides a new delivery receptacle wherein the same can be utilized for providing convenience for the user when ensuring a delivery made by a drone is received in a safe and secure location.

The present invention provides a delivery receptacle adapted to communicate with a drone and receive a package therefrom. The delivery receptacle comprises a housing having base, sidewalls, and an open upper end, defining an interior volume. The open upper end includes one or more gates that are movable between an open and closed configuration, and are configured to open when a delivery drone is detected by a control unit of the delivery receptacle. Preferably, the one or more gates are configured to automatically open when a drone is detected so as to allow the drone to deposit package therein. A front wall of the housing comprises ones or more doors thereon that allow the user to access the interior volume of the housing to retrieve the package therein.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
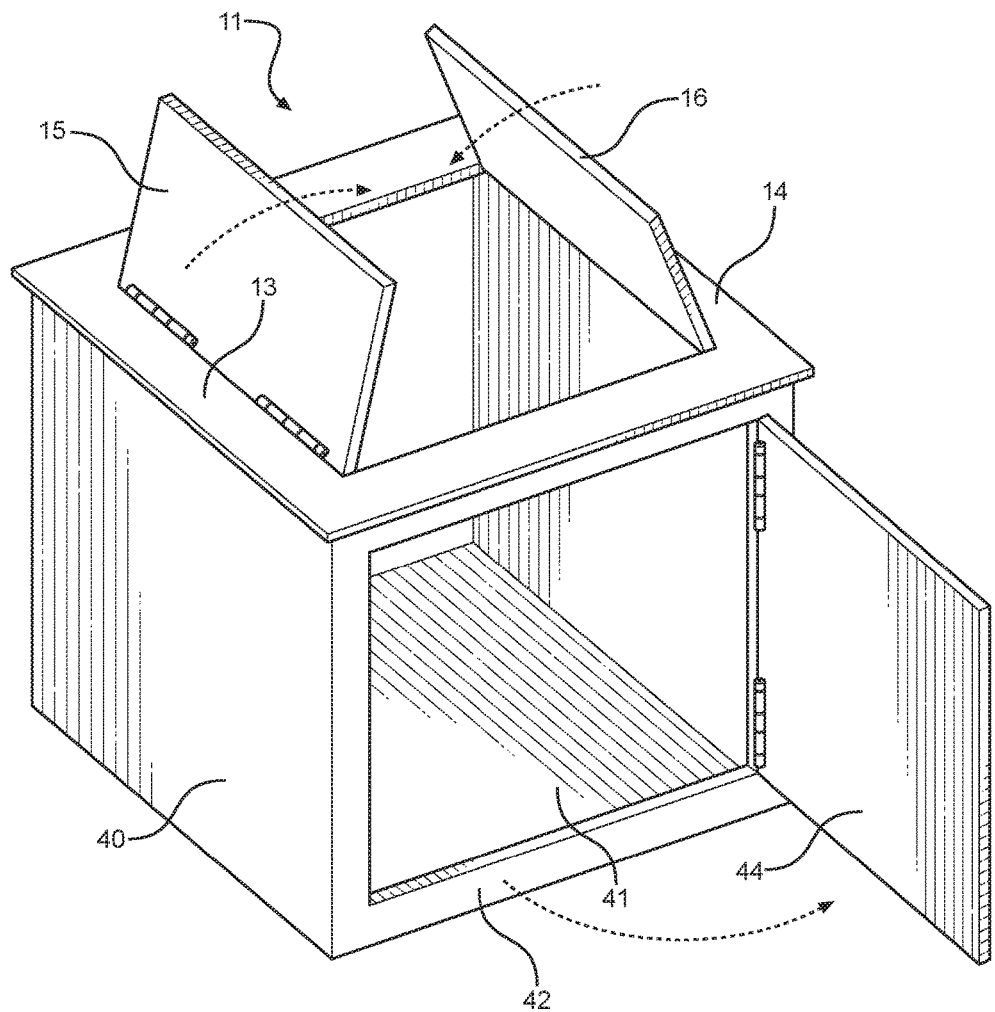
FIG. 1 shows a perspective view of the delivery receptacle.

Reference is made herein to the attached drawings. Like reference numerals are used throughout the drawings to depict like or similar elements of the delivery receptacle. For the purposes of presenting a brief and clear description of the present invention, the preferred embodiment will be discussed as used for receiving a package delivered by a delivery drone. The figures are intended for representative purposes only and should not be considered to be limiting in any respect.

Referring now to FIG. 1, there is shown a perspective view of the delivery receptacle. The delivery receptacle 11 comprises a housing 40 having a base, upstanding sidewalls, and an open upper end 14, defining an interior volume 41. The open upper end 14 includes a frame 13 having one or more gates 15, 16 thereon, wherein the gates 15, 16 are movable between a closed configuration and an open configuration. The gates 15, 16 are moved into an open configuration so as to receive a package therein, wherein the package is stored within the interior volume 41 of the housing 40 until it is retrieved by a user.

The housing 40 further comprises an open front wall 42, wherein the open front wall 42 includes one or more doors 44 thereon that can be moved between a closed configuration and an open configuration. The door 44 is preferably pivotally attached to the front wall 42 so as to allow a user to open and close the doors 44 as desired. The user can open the door or doors 44 in order to access and gather a package that has been deposited into the interior volume 41 of the delivery receptacle 11.

Figure 2:
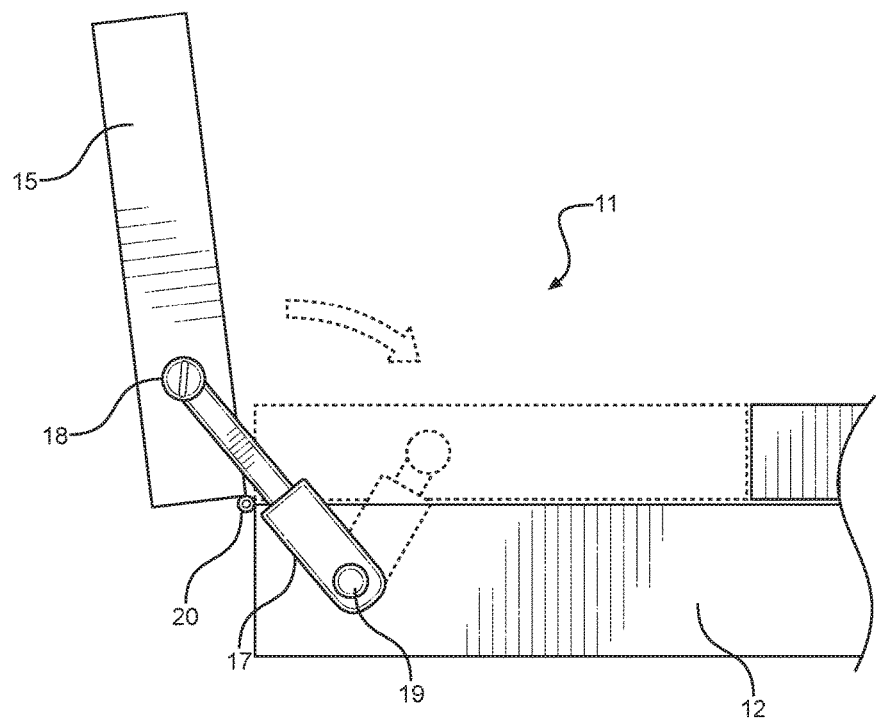
FIG. 2 shows a side cross sectional view of the delivery receptacle in an open configuration.

Referring now to FIG. 2, there is shown a side cross sectional view of the delivery receptacle in an open configuration. The delivery receptacle 11 comprises a frame 12 that defines a central opening through which a package can be inserted into the interior volume of the housing. Preferably, the frame 12 has a rectangular configuration so as to receive conventionally sized rectangular boxes. However, in alternate embodiments, the frame 12 has an alternate configuration, such as a circular shape for receiving packages therethrough.

The delivery receptacle 11 further comprises one or more gates 15 that selectively cover the opening. Each gate 15 is pivotally affixed to the frame 12. The gates 15 are each shown as having a rectangular shape and are adapted to pivot between an open and closed configuration. Preferably, the gates 15 pivot upward from the frame 12, so that the gates 15 do not pivot into the interior of the delivery receptacle 11. However, in alternate embodiments, the gates 15 may pivot inward and into the interior of the delivery receptacle 11.

The gates 15 are adapted to automatically open in the presence of a drone and include an actuator 17 for moving the gates 15 between an open and closed position. Each gate 15 is pivotally affixed to the frame 12 via a hinge 20. In the illustrated embodiment, an actuator 17 is provided wherein a first end 19 of the actuator 17 is pivotally affixed to the frame 12 and a second end 18 of the actuator 17 is pivotally affixed to a gate 15. The actuator 17 is adapted to extend in length, and as the actuator 17 extends, the door 15 rotates outward from the frame 12 into an open configuration, which exposes the opening so that a drone can deposit a package into the opening. The actuator 17 may be an electrical actuator, or may be a pneumatic or hydraulic actuator in alternate embodiments. The actuator 17 is configured so as to move the gates 15 between an opened and closed configuration.

Figure 3:
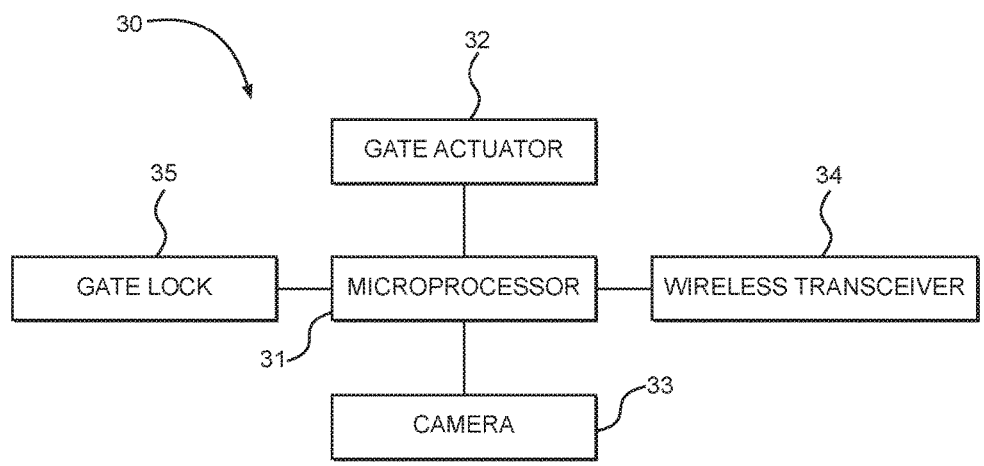
FIG. 3 shows a schematic diagram of the delivery receptacle.

Referring now to FIG. 3, there is shown a schematic diagram of the delivery receptacle. The delivery receptacle further comprises a control circuit 30 adapted to communicate with a delivery drone. The control circuit 30 comprises a wireless transceiver 34 adapted to wirelessly communicate with a drone in proximity thereto. The drone may transmit an access code or security code to the control circuit 30 so as to identify the drone and confirm that a delivery is expected to be received. The access code is received by the wireless transceiver 34 and transmitted to a microprocessor 31 that coordinates the operation of the gate actuator 32. In some embodiments, the delivery receptacle further comprises a camera 33 adapted to visually recognize the drone and/or the package carried thereby. Thus, the camera 33 may scan a barcode or other identification information carried by the drone or package in order to confirm that a delivery is expected.

If the drone is recognized, the microprocessor 31 will cause the gate actuator 32 to automatically move the gates of the delivery receptacle to an open configuration so that the drone may deposit the package into the delivery receptacle. In some embodiments, a gate lock 35 is further provided such that the gates cannot be physically opened by an intruder or other unauthorized user. In embodiments having a gate lock 35, the microprocessor 31 must send a signal to unlock the gate lock 35 prior to the gate actuator 32 being operated to open the gates.

Once opened, the gate or gates may remain open for a predetermined period of time to allow for the package to be delivered. Alternatively, the drone may send a signal to the delivery receptacle indicating that the delivery is complete, at which point the control circuit 30 will operate the gate actuator 32 to seal the opening. The gate lock 35 can also then be automatically locked to prevent the delivery receptacle from being opened.

Figure 4:
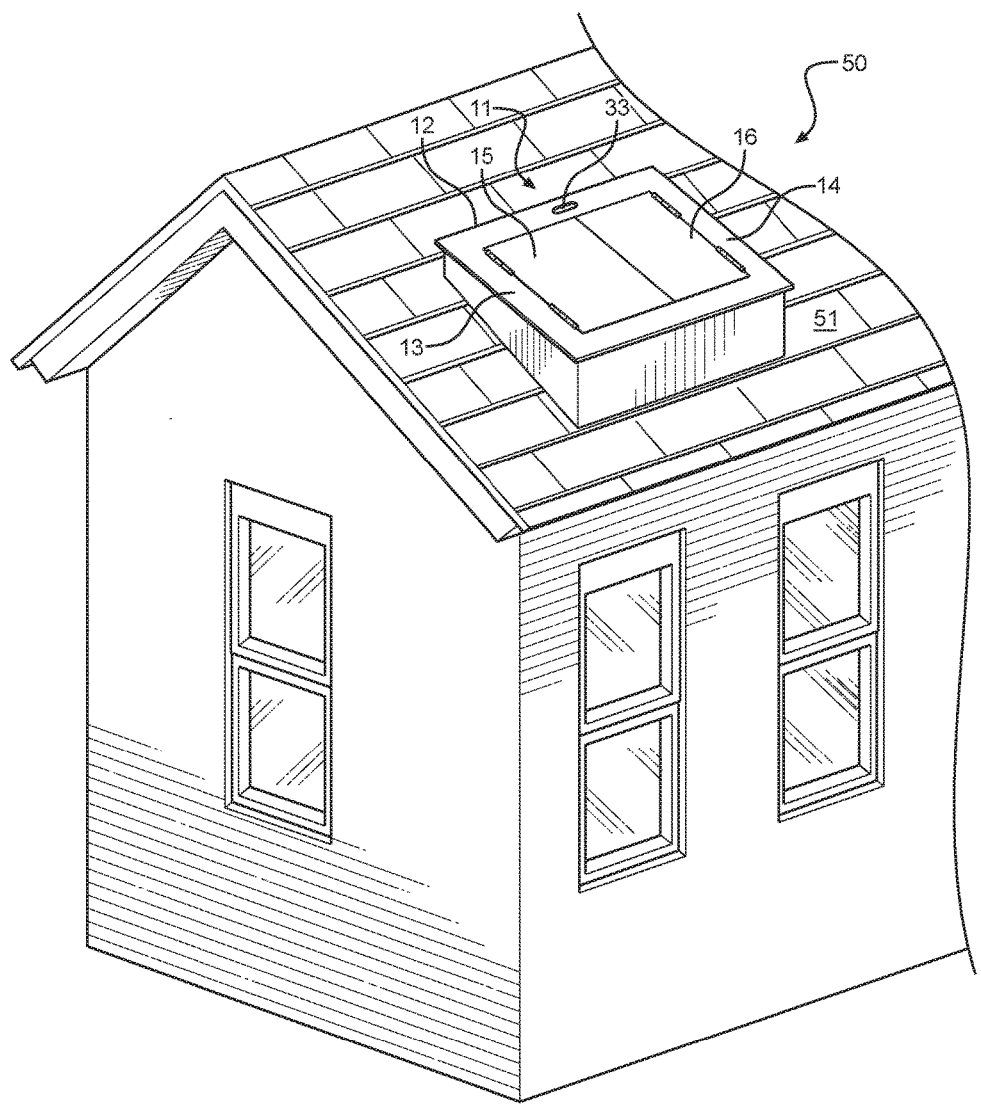
FIG. 4 shows a perspective view of the delivery receptacle as installed on the roof of a home.

Referring now to FIG. 4, there is shown a perspective view of the delivery receptacle as installed on the roof of a home. The delivery receptacle 11 is adapted to be mounted to a wall structure, such as a roof 51, of a user's residence 50 or place of business so that the delivery receptacle 11 is not readily accessed by others and so that the delivery receptacle 11 does not impact the appearance of the home or business. The delivery receptacle 11 provides a selectively openable gate 15, 16 into the user's residence so that packages can be deposited directly into the building. The delivery receptacle 11 preferably comprises a camera 33 for identifying the delivery drone and/or the package carried by the delivery drone. The delivery receptacle 11 is preferably positioned in a substantially horizontal orientation, however, the delivery receptacle 11 can be positioned on an angled or sloped roof 51 of a residence 50. The delivery receptacle 11 can be affixed to the roof 51 via any conventional fastening methods, and it is not desired to limit the invention to a specific installation method. In one embodiment, the delivery receptacle 11 is mounted to a vertical wall structure having a window, wherein the delivery receptacle 11 provides a selectively openable gate 15, 16 into the user's residence so that packages can be deposited directly into the building.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A delivery receptacle, comprising:
  a housing having a base, upstanding sidewalls, an open upper end having a frame therearound, defining an interior volume;
  one or more gates covering the open upper end and movable between an open configuration and a closed configuration via an actuator, wherein the one or more gates pivot from the frame via the actuator;
  a control circuit comprising a detection mechanism and the actuator, wherein the actuator is configured to move the one or more gates from the closed configuration to the open configuration when the detection mechanism detects a delivery vehicle;

the control circuit comprising a wireless transceiver adapted to receive a communication from the delivery vehicle;

the control circuit further comprises a microprocessor configured to operate the actuator when the wireless transceiver receives the communication from the delivery vehicle, wherein the communication is an access code;

a gate lock adapted to prevent the one or more gates from moving to the open configuration when the gate lock is engaged, the gate lock configured to engage upon receiving a confirmation message from the delivery vehicle;

the actuator further comprises a first end pivotally affixed to a side of the one or more gates and an opposing second end pivotally affixed to an exterior side of the frame;

wherein the actuator is configured to rotate the one or more gates entirely more than ninety degrees relative to a side of the open upper end of the housing forming an unobstructed area over the open upper end for the delivery vehicle to deposit objects into the housing.

2. The delivery receptacle of claim 1, wherein the detection mechanism comprises a camera.

3. The delivery receptacle of claim 1, wherein the housing further comprises one or more doors on one of the upstanding sidewalls thereof for providing access to the interior volume of the housing.

4. The delivery receptacle of claim 1, wherein the housing is fitted to a wall structure of a building, such that the one or more gates of the housing are accessible from an exterior side of the wall structure.

5. A delivery receptacle, consisting of:

a housing having a base, upstanding sidewalls, and an open upper end, defining an interior volume;

one or more gates covering the open upper end and movable between an open configuration and a closed configuration via an actuator;

a control circuit comprising a detection mechanism and the actuator, wherein the actuator is configured to move the one or more gates from the closed configuration to the open configuration when the detection mechanism detects a delivery vehicle;

the control circuit comprising a wireless transceiver adapted to receive a communication from the delivery vehicle;

the control circuit further comprises a microprocessor configured to operate the actuator when the wireless transceiver receives the communication from the delivery vehicle, wherein the communication is an access code; and a gate lock adapted to prevent the one or more gates from moving to the open configuration when the gate lock is engaged, the gate lock configured to engage upon receiving a confirmation message from the delivery vehicle.

* * * * *